US012263626B2

(12) United States Patent
Nattrass et al.

(10) Patent No.: US 12,263,626 B2
(45) Date of Patent: Apr. 1, 2025

(54) METHOD AND APPARATUS FOR PRODUCING POROUS PLASTIC PROFILES (71) Applicant: MG IP LTD, Knaresborough (GB)

(72) Inventors: Mark Andrew Nattrass, Knaresborough (GB); Graham Michael Berville, Knaresborough (GB)

(73) Assignee: MG IP LTD, Knaresborough (GB)

( * ) Notice: Subject to any disclaimer, the term of this patent is extended or adjusted under 35 U.S.C. 154(b) by 724 days.

(21) Appl. No.: 17/261,837

(22) PCT Filed: Jul. 24, 2019

(86) PCT No.: PCT/GB2019/052078
§ 371 (c)(1),
(2) Date: Jan. 20, 2021

(87) PCT Pub. No.: WO2020/021263
PCT Pub. Date: Jan. 30, 2020

(65) Prior Publication Data
US 2021/0291421 A1   Sep. 23, 2021

(30) Foreign Application Priority Data

Jul. 24, 2018 (GB) .................................... 1812028
Jul. 15, 2019 (GB) .................................... 1910136

(51) Int. Cl.
*B29C 48/05* (2019.01)
*B29C 48/00* (2019.01)
(Continued)

(52) U.S. Cl.
CPC ...... *B29C 48/0011* (2019.02); *B29C 48/0021* (2019.02); *B29C 48/05* (2019.02);
(Continued)

(58) Field of Classification Search
CPC ... B29C 48/0011; B29C 48/05; B29C 48/911; B29C 48/0021; B29C 69/001; B29K 2101/12; B29K 2105/26; B29L 2031/001
(Continued)

(56) References Cited

U.S. PATENT DOCUMENTS 3,687,759 A   8/1972   Werner et al.
3,691,004 A   9/1972   Werner et al.
(Continued)

FOREIGN PATENT DOCUMENTS

DE   4217739 A1   2/1993
EP   3256632 B1   3/2019
(Continued)

OTHER PUBLICATIONS

"International Search Report and Written Opinion of the International Searching Authority", International Application No. PCT/GB2019/052078, Jan. 9, 2020, 22 pp.
(Continued)

Primary Examiner — Jeffrey M Wollschlager
Assistant Examiner — Xue H Liu
(74) Attorney, Agent, or Firm — Myers Bigel, P.A.

(57) ABSTRACT

A method is disclosed for manufacturing connectable or non-connectable elongate porous plastic profiles 12 from substantially continuous randomised extruded plastic strands made of recycled thermoplastics. Current manufacturing processes can manufacture similar products, comprising short partially melted plastic particles melded together forming planks. These planks, however, are inherently friable, easily broken and not readily connectable. These shortcomings are caused by the manufacturing method used, being friction plate agglomeration. This invention utilises an extrusion process, which produces substantially endless random strands of thermoplastic 13 which drop and are
(Continued)

welded together to form a porous mass, which is then compressed into boards or planks by pulling the mass through a forming tool 6 and 7. The profile can be adjusted to form edge recesses allowing the planks to be fitted together, for instance to form area coverings, or they can simply be laid end to end to form drainage channels.

6 Claims, 11 Drawing Sheets (51) Int. Cl.
| | |
|---|---|
| *B29C 48/88* | (2019.01) |
| *B29C 69/00* | (2006.01) |
| *E02B 11/00* | (2006.01) |
| *E02D 31/02* | (2006.01) |
| *B29K 101/12* | (2006.01) |
| *B29K 105/26* | (2006.01) |
| *B29L 31/00* | (2006.01) |

(52) U.S. Cl.
CPC .......... *B29C 48/911* (2019.02); *B29C 69/001* (2013.01); *E02B 11/00* (2013.01); *E02D 31/02* (2013.01); *B29K 2101/12* (2013.01); *B29K 2105/26* (2013.01); *B29L 2031/001* (2013.01); *E02D 2200/1635* (2013.01); *E02D 2250/0015* (2013.01); *E02D 2300/0012* (2013.01); *E02D 2300/0017* (2013.01)

(58) Field of Classification Search
USPC .......................................................... 264/103
See application file for complete search history.

(56) References Cited

U.S. PATENT DOCUMENTS

| | | |
|---|---|---|
| 4,405,297 A | 9/1983 | Appel et al. |
| 2003/0003834 A1 | 1/2003 | Berrigan et al. |
| 2009/0007509 A1 | 1/2009 | Jordan et al. |
| 2013/0189472 A1 | 7/2013 | Takaoka |
| 2014/0035191 A1 | 2/2014 | Takaoka |
| 2018/0147792 A1 | 5/2018 | Kojima et al. |

FOREIGN PATENT DOCUMENTS

| | | |
|---|---|---|
| GB | 2543282 A | 4/2017 |
| JP | H10899093 A | 4/1996 |
| WO | 2004082912 A1 | 9/2004 |
| WO | 2008085545 A2 | 7/2008 |
| WO | 2011002878 A2 | 1/2011 |

OTHER PUBLICATIONS

"Patents Act 1977: Combined Search and Examination Report under Sections 17 and 18(3)", GB Application No. GB1910604.6, Jan. 24, 2020, 9 pp.

"Patents Act 1977: Examination Report under Section 18(3)", GB Application No. 1910604.6, Aug. 14, 2020, 5 pp.

"Patents Act 1977: Examination Report under Section 18(3)", GB Application No. GB1910604.6, Oct. 22, 2020, 4 pp.

METHOD AND APPARATUS FOR PRODUCING POROUS PLASTIC PROFILES

RELATED APPLICATIONS

This application is a 35 U.S.C. § 371 national stage application of PCT Application No. PCT/GB2019/052078, filed on Jul. 24, 2019, which claims priority from Great Britain Patent Application No. 1910136.9, filed on Jul. 15, 2019, and Great Britain Patent Application No. 1812028.7, filed on Jul. 24, 2018, the contents of which are incorporated herein by reference in their entireties. The above-referenced PCT International Application was published in the English language as International Publication No. WO 2020/021263 A1 on Jan. 30, 2020.

This invention relates to a method of making porous plastic profiles, especially from recycled plastics, which can be shaped to be connectable to each other to form larger structures. The invention also relates to profile products of this kind, and to production lines for making them.

Porous solids such as ceramics or concrete have long been used for drainage, for instance to make pipes laid in the ground, through which water seeps or flows. More recently porous plastic profiles, sometimes referred to as planks or batts, have been used for the control of liquids and gases. An example is to be found in US 2009/007509 by Jordan et al., where porous webs of plastic fibres are used to make strips which are used for drainage in the construction of a house. These webs do not appear to have any load-bearing capacity.

Since plastics are not intrinsically porous, a method of making porous plastic solids has to be found. For instance, WO 2004/082912 describes a method of manufacturing porous plastic drainage batts from recycled plastics. It describes a method of densifying chopped plastic particles into many hot soft noodles measuring between 5 mm to 50 mm using a Friction Plate Agglomerator which generates heat through friction. The resulting hot noodles fall from the Friction Plate Agglomerator into a chilled compactor funnel in which the noodles meld together. The melded noodle mass exits the compactor turning approximately 90 degrees onto a moving conveyor belt upon which water is sprayed to cool down both the conveyor and the noodle mass into a continuous sheet containing voids which is cut to length into batts/planks, which are about 250 mm in width, 50 mm in depth and of convenient length.

The above described method produces only batts/planks of limited fixed dimensions and cannot produce multiple batts/planks simultaneously. It also does not provide for creating integral jointing features in the material flow direction.

As the heat generated is by means of friction, there is resultant wear upon the friction plates which is exacerbated by non-plastic impurities in the feedstock. In order for the machine to perform optimally, these plates require frequent repair or replacement. This is time-consuming and causes significant expense.

A further disadvantage is that the production of boards which connect together by integral means in the web flow direction, retaining similar overall depth, is not feasible. Downstream pulling is required in order to achieve this successfully, but the friable nature of the product makes pulling difficult. Moreover, the passage of the melded noodle mass exiting the compactor funnel through 90 degrees adds additional friction. This, coupled with the weakened meld strength of the noodle mass, renders the use of a pulling device downstream impractical as the noodle mass is not strong enough to withstand a sufficient pulling force without breaking. The introduction of any attachments to the side walls of the conveyor creating indentations or protuberances to provide a joining mechanism in the material flow direction would create additional friction and further exacerbate this issue.

A Friction Plate Agglomerator is designed to densify flexible plastic waste thus minimising potential feedstock supply as much of the available waste feedstock is in hard plastic form. This method is also restricted to producing softened, not fully melted, short noodles to be loosely formed into batts/planks.

The noodles contained therein have reduced linear strength directly related to their short length and may also not have experienced enough heat, as a Friction Plate Agglomerator has little adjustable control over the temperature of the resultant noodles. This leads to poor plastic homogenisation, incomplete melt, and reduced weld strength. The batts produced by this method are therefore weak and friable and are thus unsuitable for forming integrally jointed assemblies.

This invention in one aspect relates to methods of making porous plastic profiles from endless strands of recycled plastics, by extruding such strands and partially fusing them together in a heap, then shaping the resulting mass continuously to the required profile. These profiles can be strong in tension and are suitable for modular connection. Also within the purview of the invention are profiles, boards, solid void fillers such as water storage void fillers such as drainage water storage void fillers, attenuation tanks and other articles made from the agglomeration of irregularly collapsed thin fused strands of diameter many times smaller than their length, the level of compaction of the agglomeration being such that the articles are permeable to fluids, particularly water. In another aspect the invention covers machines for making such profiles.

A key feature of the method is the fall of the continuous extruded strands onto a base, plate or other substrate, which may be part of a forming tool. As they land, the strands diverge in different directions, thus ensuring that there are always voids between strands crossing each other at various angles. The ratio of void to solid material in the finished product (void volume/solid volume) is ideally in the range 20% to 80%. However, higher or lower ratios may be useful in some embodiments and still fall within the scope of the present invention. Some embodiments may have a ratio of void to solid material in the range from 5% to 95%. Ratios of void to solid in the range 5% to 20% may be useful in some embodiments, i.e. a relatively high solid volume. For most applications it is desirable that liquids have to follow a convoluted path through the product, i.e. there is no line-of-sight penetration. To achieve the necessary convolution the height of the fall from the extruder should be at least 30 cm, preferably at least 60 cm or at least 1 m; however, it does depend on the diameter of the strand; a suitable ratio of height to strand diameter might be at least 20, at least 50 or at least 100. In some embodiments the height of the fall may be less than 30 cm, for example 10 cm, 15 cm, 20 cm or 25 cm. It is to be understood that, typically, the higher the fall, the less the amount of cooling required, e.g. water or air cooling.

In an aspect of the present invention there is provided a method of forming porous thermoplastic profiles, comprising:

extruding strands of thermoplastic material to a length many times their diameter;

contact-welding them together to form a porous accumulated mass; and shaping this mass to form the profile.

The method may comprise extruding the strands in a substantially continuous manner.

Optionally, the porous mass is formed by letting the extruded strands drop at least 15 cm onto a forming base. Other drop heights may be useful such as 10 cm, 20 cm, 25 cm, 30 cm, 500 cm, 1 m or any other suitable height.

The method may further comprise the forced cooling of the porous plastic profile before and/or during and/or after contact of the strands.

The method may further comprise the substantially continuous transport of the porous plastic profile to form a continuous profile.

The method may comprise the substantially continuous transport of the porous plastic profiled by a variable-speed device(s) to form a continuous profile.

Optionally, the transport is effected by drawing from downstream of the drop, and/or by moving the mass at the point of the drop.

The method may further comprise the cross cutting of the resultant continuous profile into required lengths once sufficiently cooled.

The method may further comprise applying a compressive force to the random strand mass before the completion of cooling.

Optionally, the method further comprises the division of the mass by one or more substantially vertically orientated plates causing more than one profile to be produced simultaneously.

The method may further comprise the shaping of the profile by substantially horizontally mounted inserts within the strand mass creating longitudinal recesses allowing the lateral connection together of numerous profiles.

The method may comprise creating longitudinal recesses along opposite edges, optionally along opposite corner edges, allowing the lateral connection together of numerous profiles.

The method may further comprise the addition of additives to the molten strand mass after extrusion and before or during compression, such as the addition of performance-enhancing or colour-inducing additives before or during extrusion.

Optionally, the additives include woven or non-woven linear items.

The method may further comprise the addition of non-melting particles to the thermoplastic material before extrusion.

The method may comprise the addition of pre-cooling to the molten uniform spaghetti-like strands prior to accumulation and randomisation, for instance by reducing the temperature of the die plate, causing the surface of the molten uniform spaghetti-like strand to develop a roughened surface caused by the increase in friction between the molten plastic and the die plate as it exits the die plate holes.

The method may further comprise the repeat indentation into the surface of the profiles using roller(s) with machined surfaces horizontally oriented substantially at 90 degrees to the machine direction.

Optionally, forming porous thermoplastic profiles comprises forming porous thermoplastic profiles which can be connectable or interlockable.

Optionally, extruding strands of thermoplastic material comprises extruding strands of recycled or other thermoplastic material.

In a further aspect of the invention there is provided apparatus for making a continuous porous thermoplastic profile, comprising: an extruder for extruding uniform strands of thermoplastic to a length many times their diameter, a tool on to which the strands can drop after emerging from the extruder, forming a porous mass, the tool being arranged to shape the plastic mass, a means, possibly included in the tool at least in part, for drawing the mass through the tool, and a separator for separating the drawn profile into lengths.

The separator may comprise a travelling saw. Alternatively, the separator may comprise a guillotine, a laser cutting apparatus, water cutting apparatus, or any other suitable cutting apparatus.

Optionally, the extruder includes a die plate with several apertures, preferably in at least two rows.

Optionally, the tool has a taper in the direction of drawing the mass.

Optionally, the tool comprises a roller for compressing the mass in a substantially vertical direction.

Optionally, the apparatus comprises a tapered lower tool portion for shaping the mass in a substantially horizontal direction and an upper tool portion for compressing the mass in a substantially vertical direction.

The upper tool portion may comprise the roller.

Optionally, the tool has perforations in its walls in order for cooling agent to penetrate through the tool walls, so as to cool the product as it passes through, and to reduce friction.

Optionally, the walls of the tool are internally cooled.

The apparatus may further include a cooling bath downstream of the tool.

The apparatus may further comprise a temperature-controlled extrusion barrel extension containing more than one bend fitted between the extruder and die plate in order to alter the height of the die plate relative to the landing level of the molten uniform strands.

In one aspect of the invention there is provided an elongate porous profile of compacted strands of plastics material, the strands being substantially continuous throughout the length of the profile.

Optionally, the plastics material is at least partly recycled.

Optionally, the void percentage in the finished product is between 20% and 80%, and/or the diameter of the strands is in the region of 3-12 mm, optionally in the region of 3-8 mm.

Optionally, the edges of the profile are shaped to allow interlocking or joining of adjacent profiles.

In a further aspect of the invention for which protection is sought there is provided an assembly of profiles according to a preceding aspect, further comprising a means for fixing of the profiles to each other.

The profiles of the assembly may be joined together to form a substantially even or flush surface with reduced inter-profile movement and flexibility.

In one aspect of the invention there is provided use of a profile according to a preceding aspect, or an assembly according to a preceding aspect, in a drainage channel in the ground.

In one aspect of the invention there is provided a method of forming porous thermoplastic profiles, comprising:
  extruding strands of thermoplastic material substantially continuously;
  contact-welding the strands together to form a porous accumulated mass; and
  shaping this mass to form the profile.

The porous mass may be formed by letting the extruded strands drop at least 15 cm onto a forming base.

The method may further comprise the forced cooling of the porous thermoplastic profile before and/or during and/or after contact of the strands.

The method may further comprise the substantially continuous extrusion of strands and the substantially continuous transport of the porous thermoplastic profile to form a continuous profile.

The method may comprise the substantially continuous transport of the porous thermoplastic profile by a variable-speed device(s) to form a continuous profile.

The strands of thermoplastic material may be substantially endless.

The strands of thermoplastic material may be substantially endless from one end of the extruded profile to the other.

It is to be understood that in some embodiments the length of one or more of the strands may be interrupted intermittently, for example due to variations in the flow of extrudate from a die head of an extruder extruding the strands whilst still falling within the scope of the present invention.

In one aspect of the invention there is provided an elongate porous profile of compacted strands of plastics material, at least some of the strands being continuous. Embodiments of the invention are hereinafter further described by way of example, with reference to the accompanying drawings, in which:—

Figure 1:
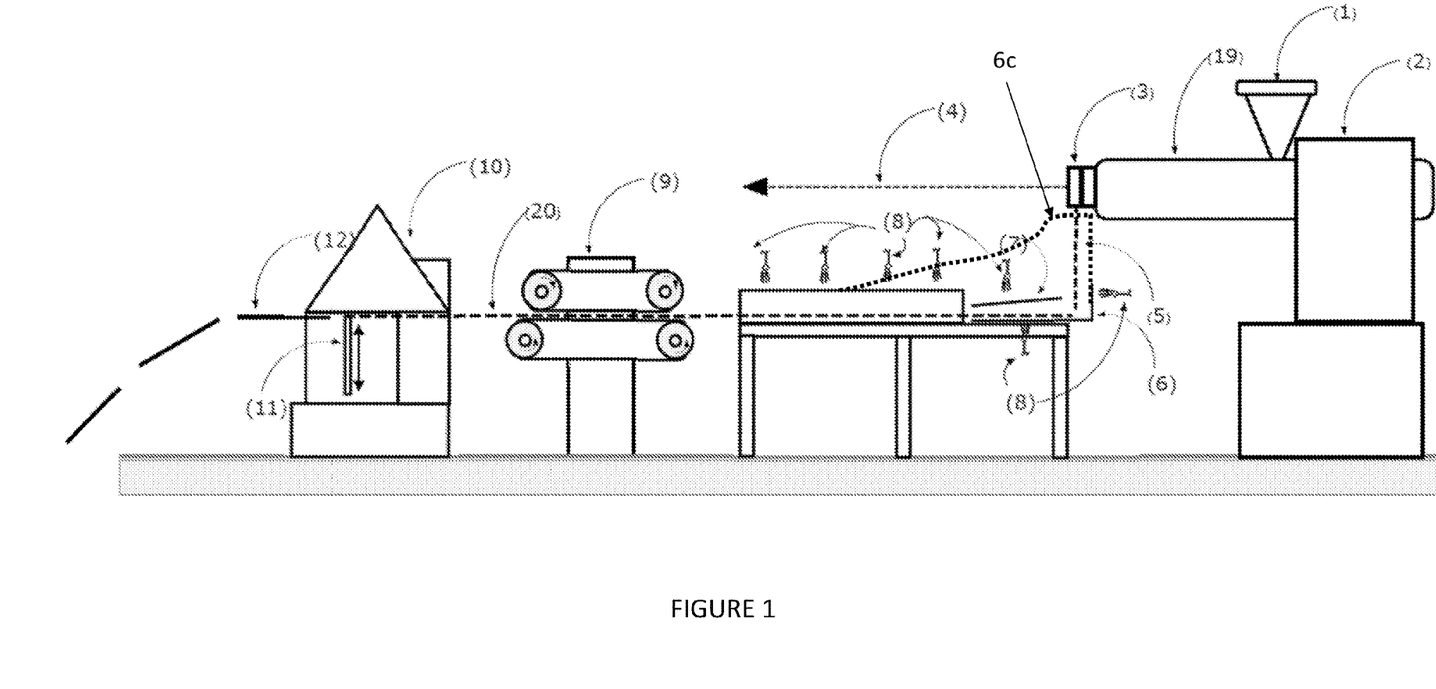
FIG. 1 is a schematic illustration of an extrusion line for producing porous plastic profiles.

A production line for making profiles in accordance with the invention is shown in FIG. 1. The process runs from right to left. Soft, hard or mixed waste thermoplastic chips are fed into the feed opening 1 of a raised extruder 2 and transported by an Archimedes screw, not shown, or any other suitable mechanism, into or through a temperature-controlled barrel 19 which melts them. The melted thermoplastic is then pumped through a fixed heated vertical die plate 3 containing a plurality of preferably circular holes in two horizontal rows. A different number of rows may be useful in some embodiments such as a single row or more than two rows. This barrel may be equipped with a filtration device or breaker plate, likewise not shown, to allow the removal of unwanted contaminants often found in thermoplastic waste. However, the process is very tolerant of incorporated particles up to a certain size and such "contaminants" can even be added deliberately. In some embodiments, non-melting particulates may be included with the feed introduced through opening 1, the non-melting particulates passing with the melted thermoplastic through the filtration plate, where fitted, and the holes in the die plate 3.

Figure 2:
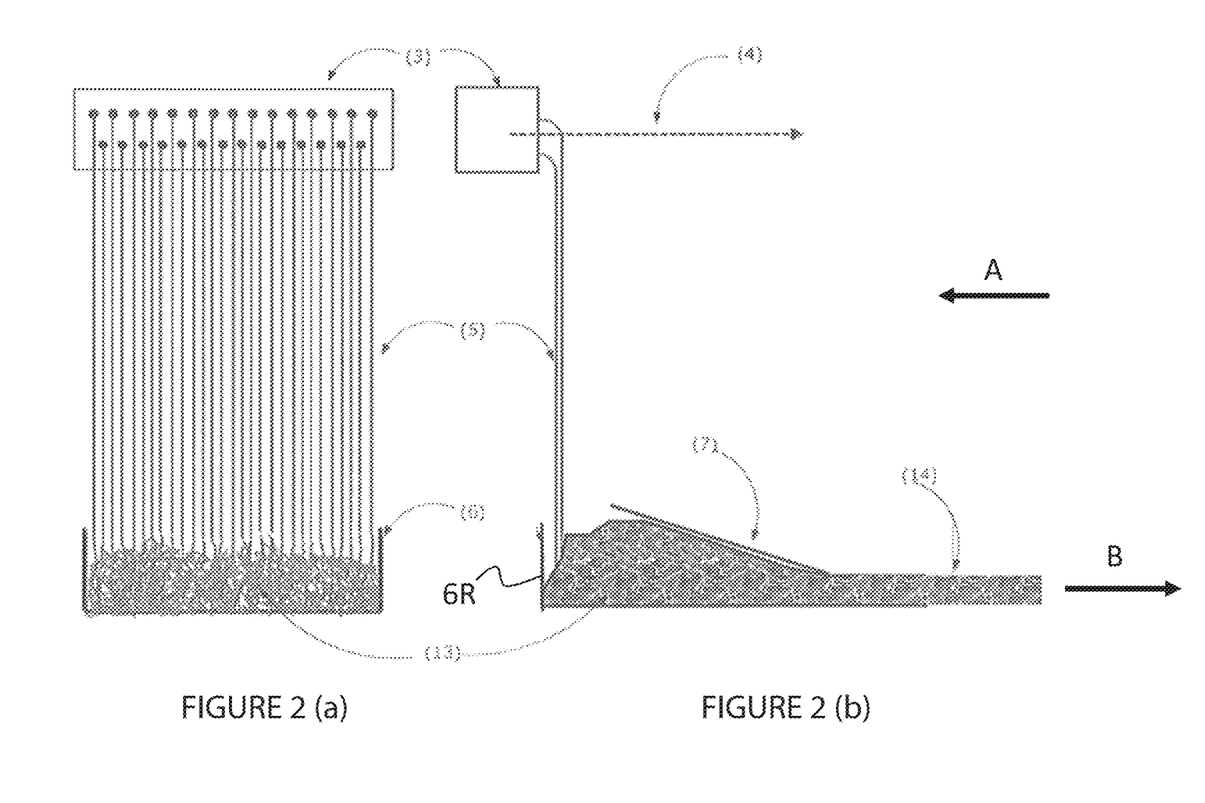
FIG. 2 is a schematic representation showing both (a) front and (b) side elevations of a heated die plate producing uniform molten substantially endless spaghetti-like strands accumulating in a random fashion in a generally horizontal tool or former, (c) the side view of FIG. 2(b) and a corresponding plan view showing tapered side walls, and (d) the side view of FIG. 2(b) and a corresponding plan view of an embodiment with parallel side walls.

The uniform, molten, substantially endless spaghetti-like strands, shown as a dashed line 5, exit the heated die plate 3, whereupon they fall a distance of about 50 cm and accumulate in a heap 13 (FIG. 2). FIG. 2(a) shows the strands extruding from the die plate 3 as viewed in the direction of arrow A of FIG. 2(b). FIG. 2(b) is a side view, the direction of movement of extrudate being from left to right (arrow B). FIG. 2(c) shows the arrangement of FIG. 2(a), (b) in plan view (lower part of FIG. 2(c)) with a lower part of FIG. 2(b) shown above it for ease of comparison.

The strands accumulate in a heap 13 in the first part of a substantially horizontally mounted collecting and shaping tool or former having lower and upper tool parts 6 and 7. The lower part 6 is essentially a tray with upstanding sides 6 and (rear) end 6R to contain the mass of stands. The upper part 7 is an inclined plate designed to compress and form the mass as it is transported forwards, in the direction of arrow B in FIG. 2. This process of accumulation on the tray 6 disturbs the uniformity of the strands created by the heated die plate and causes a build-up of a random mass of strands which, upon contact with each other, weld together to form an agglomeration or accumulation 13, without adhering to the former (tool) 6 and 7. The parts (formers, or tools) 6, 7 are water cooled in the present embodiment in order to reduce adherence of the strand mass 13 thereto.

The strand mass contained is then reduced in volume as it is driven, or drawn, under the upper tool wall 7, allowing fine tuning of the compression of the contents and hence control of the void ratio (plastic:void or void:total volume) within the strand mass 13. The internal surfaces of the tool may be treated or coated to minimise friction between the strand mass 13 and the contact surfaces of the tool. This may also be achieved by adding pressurised coolant to the contact surfaces or internal voids within the tool 6 and 7 in order to cool the surfaces in contact with the strand mass 13; as noted above, the tools 6, 7 are water cooled in the present embodiment. The mass 13 is driven in this embodiment by virtue of being drawn by a haul-off 9 (FIG. 1) consisting of upper and lower parallel belt drives, which is controllable in both line speed and degree of nip force exerted on the profile between the belts, causing a pulling force which pulls the randomised strand mass 13 through the tool 6, 7. This tool further compresses the still hot strand mass 13 into the desired shape. This compression increases the contact weld between strands, improving overall strength without eliminating all the voids: the resultant cooled strand mass 14 still retains voids between the strands with a void/solid ratio of between 20% and 80%, ideally about 25%-40%, dependent upon the specific application.

Should additional cooling of the strand mass be required this can be provided by a water bath 8 located between the tool 6, 7 and the haul-off mechanism 9. The line may also be provided with a continuous weighing device, but this is not shown.

In some embodiments, lateral sides 6c may decrease in height in the direction of draw of the strand mass from a height above a base of the tray 6 that is substantially equal to or a little lower than that of the die plate 3 to a lower height at least equal to an intended thickness of the profiles 20 to be formed. An example of such a side is shown in dotted outline in FIG. 1. Depending on the application, the sides 6, 6c may also be arranged to taper inwardly as viewed from above so the distance between the sides 6, 6c decreases in the direction of draw. In the embodiment of FIGS. 2(*a*) and 2(*b*), the upstanding side walls 6 initially taper inwardly in a first section 6*t* as shown in plan view in FIG. 2(*c*), as the strand mass 13 is drawn under the upper tool wall 7. The strand mass 13 is thereby compressed in a lateral (side to side) direction and a vertical direction. A second section 6 downstream of the first section 6*t* (where upper tool wall 7 is provided) has substantially parallel side walls 6. This is discussed further below.

Advantageously, the surface over which the strand mass travels may be perforated to allow cooling water to drain therethrough.

FIG. 2 shows, (a) from the front and (b) from the side, the strands of melted plastic 5 as they are extruded from the die plate 3, fall in a heap 13 on the base part 6 of the former and are pulled through under the inclined upper shaping tool 7 to a constant thickness 14, under the influence of the haul-off mechanism 9. The intrinsic strength and interconnected nature of the agglomerated strand mass allows the tension to be effective in this process, as the strands are essentially of indefinite length, in practice at least 1 m. FIG. 2 also shows the two rows of apertures through which the plastic material is extruded. It is preferable to have at least two such rows, with a horizontal offset, in order to have the falling strands sufficiently close together to prevent through-voids in the finished product.

Figure 3:
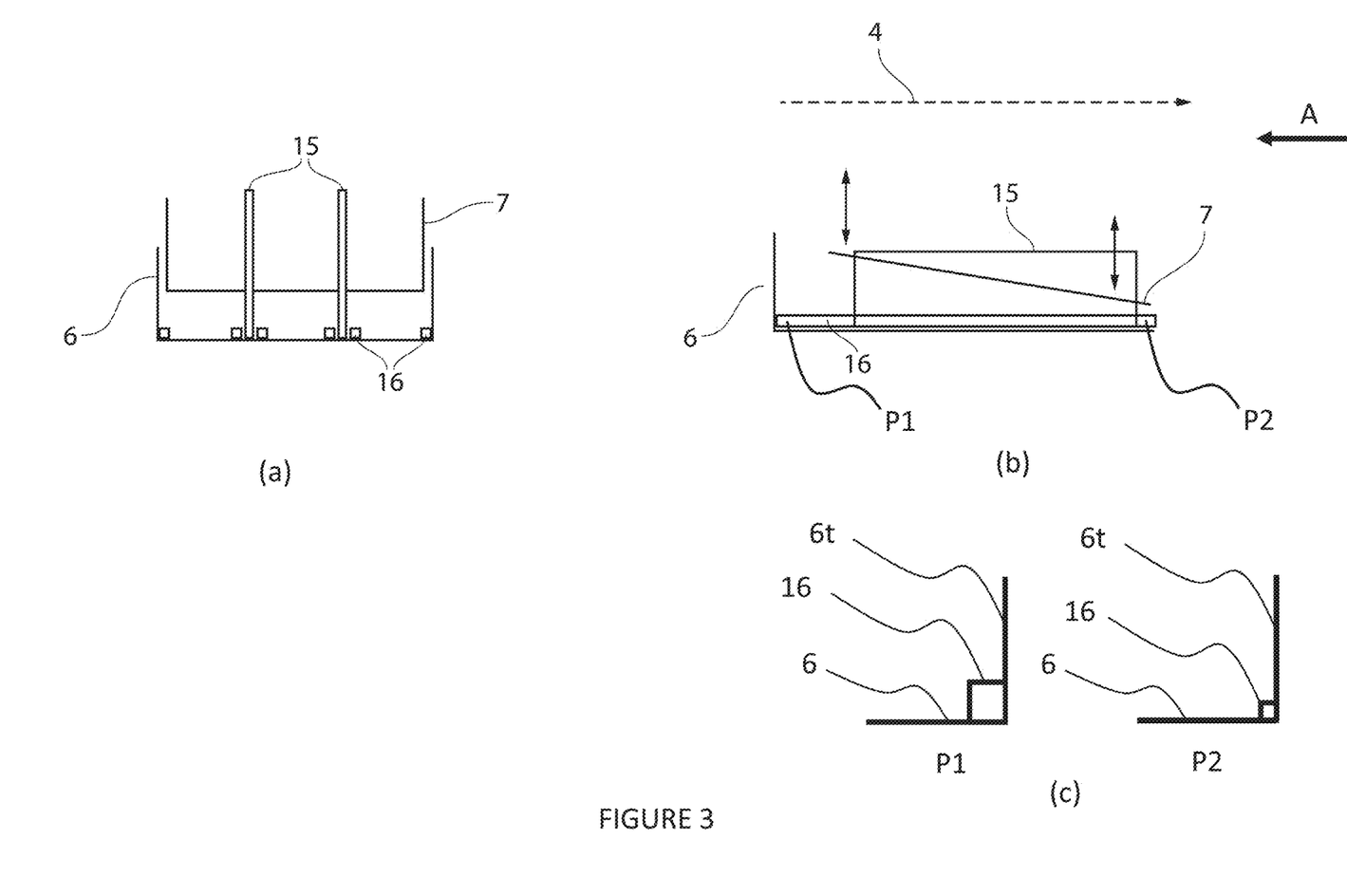
FIG. 3 is a schematic representation showing both (a) front and (b) side elevations of the tool showing splitters (in the form of 'inserts') that are inserted to allow the strand mass to be split longitudinally and (corner) inserts in the forming tool that allow recesses to be created within the profile along its length, and (c) an enlarged view of the (corner) inserts at respective successive positions P1 and P2 in the direction of transport of the strand mass, showing tapering of the corner inserts.

FIG. 3 shows a way in which the basic former 6, 7 can be modified to give different output profiles. FIG. 3(*a*) is a view of the apparatus in the direction of arrow A of FIG. 3(*b*) which is a side view, the direction of movement of extrudate being from left to right in FIG. 3(*b*). Without necessitating a complete changeover of the former 6, 7, inserts 16 may be added to the inside surfaces of the former to create uniform recesses, protuberances or both to the finished profile. These recesses and protuberances may be of use in fitting together profiles in a modular fashion, as discussed below. FIG. 3(*c*) is an enlarged view of a corner portion of the former 6 showing tapered side wall 6*t* and corresponding (corner) insert 16 as viewed along the direction of flow of strand mass 13, at positions P1 and P2 at opposite ends of the tapered sidewall portion 6*t*. It can be seen that the insert 16 decreases in cross-sectional area to the desired size (position P2) taking into account subsequent shrinkage of the strand mass 13 as it cools to its final size. Thus, in this embodiment the side wall 6*t* has a taper (inwardly) whilst the insert 16 also has a taper (reducing its cross-sectional area) in the direction of transport of strand mass 13. It is to be understood that the strand mass 13 is hotter and more readily shaped at the extruder end (upstream end) compared to locations downstream thereof.

Vertically orientated plate-like inserts 15 may also be added to the former 6 and 7 which will cause the random strand mass 13 to split longitudinally, in the machine direction 4, causing a plurality of narrower profiles to be produced simultaneously. In FIG. 3, six inserts 16 are shown together with two plate-like inserts 15 which may also be referred to as 'splitters' or 'splitter plates' 15. The splitters 15 cause the process to produce three separate lengths of product sheet, formed in parallel, whilst the six inserts 16, in combination with the inserts or splitters 15, cause recesses to be formed along opposed lower edges of each sheet. In the case that no splitters 15 are employed, then only two inserts 16 would be required in order to form recesses along opposed lower edges of the (single) lengths of profile 20 (product sheet). Any suitable number of splitters 15 and inserts 16 may be used. If no recesses are required at the corners of the profiles then no inserts 16 would be required.

As noted above, in order to urge the strand mass into the recesses formed by the inserts 16, the side walls 6 and, if present, splitters 15, can taper inwardly (as seen in plan in FIG. 2(*c*)), so that an additional compressive force is exerted to cause the extrudate to conform to the shaped edges. For slab-sided product, the chilled side walls and splitters can be parallel as shown in FIG. 2(*d*). It is to be understood that inward tapering of the side walls 6*t* and, as appropriate, splitters, where fitted, is equally applicable to the case where a different means for applying vertical compression to the strand mass is employed, such as in embodiments where a roller 7 is employed (FIG. 6) instead of upper tool wall 7 (FIG. 2(*b*). In the case that only a single, centrally located splitter 15 is provided, in order to form profiles of substantially equal width, the splitter 15 may be oriented in its longitudinal direction substantially parallel to the direction of transport of the strand mass 13 (without any 'taper'), even in the case that tapered side walls 6*t* are provided.

The now completely formed continuous profile 20 exits the haul-off 9 and transfers to a travelling saw 10 and is cross cut to the required length by a circular saw blade 11 creating finished profiles 12 of a given length.

The overall width of profiles typically achievable (i.e. before any possible division) is perhaps 200-500 mm in the embodiment shown, which has a die head 3 having a width of around 450 mm between holes (apertures) at opposite ends of the die head 3, the profile depth being up to 100 mm or so in the present embodiment. It is to be understood that other widths are achievable in other embodiments such as 1 m, 2 m, 2.4 m (a standard width in some jurisdictions such as the UK, since it corresponds to approximately 8 feet), 3 m or any other suitable width. Once these profiles in the form of batts, rods or planks are solidified they are typically made up of a mass of plastics fibres or strands of diameter in the range 3-12 mm, in some embodiments more, substantially continuous, from one end of the profile to the other, and of course fused to other strands over a large part of their length so that in places individual strands can no longer be discerned. It is to be understood that the mass of plastics fibres or strands is convoluted from one end of the profile to the other.

As indicated by double arrows in FIG. 3(*b*), tool 7 may be raised and lowered, and in some embodiments tilted to different angles in addition or instead, in order to control the final thickness of product 20. Tilting of the tool to adjust an angle of the tool with respect to a horizontal plane may be performed in order to adjust a rate of reduction of thickness of the mass of extrudate 13 as it passes under the tool 7.

In a variant embodiment the components of the former 6 and 7 can be replaced in whole or part by a number of rollers. These can be idle or driven, belted or un-belted, still allowing for compressive force to be transferred to the strand mass 13. Such an embodiment allows for repeat impression printing onto the surface of the profile whilst it is still hot enough.

Figure 4:
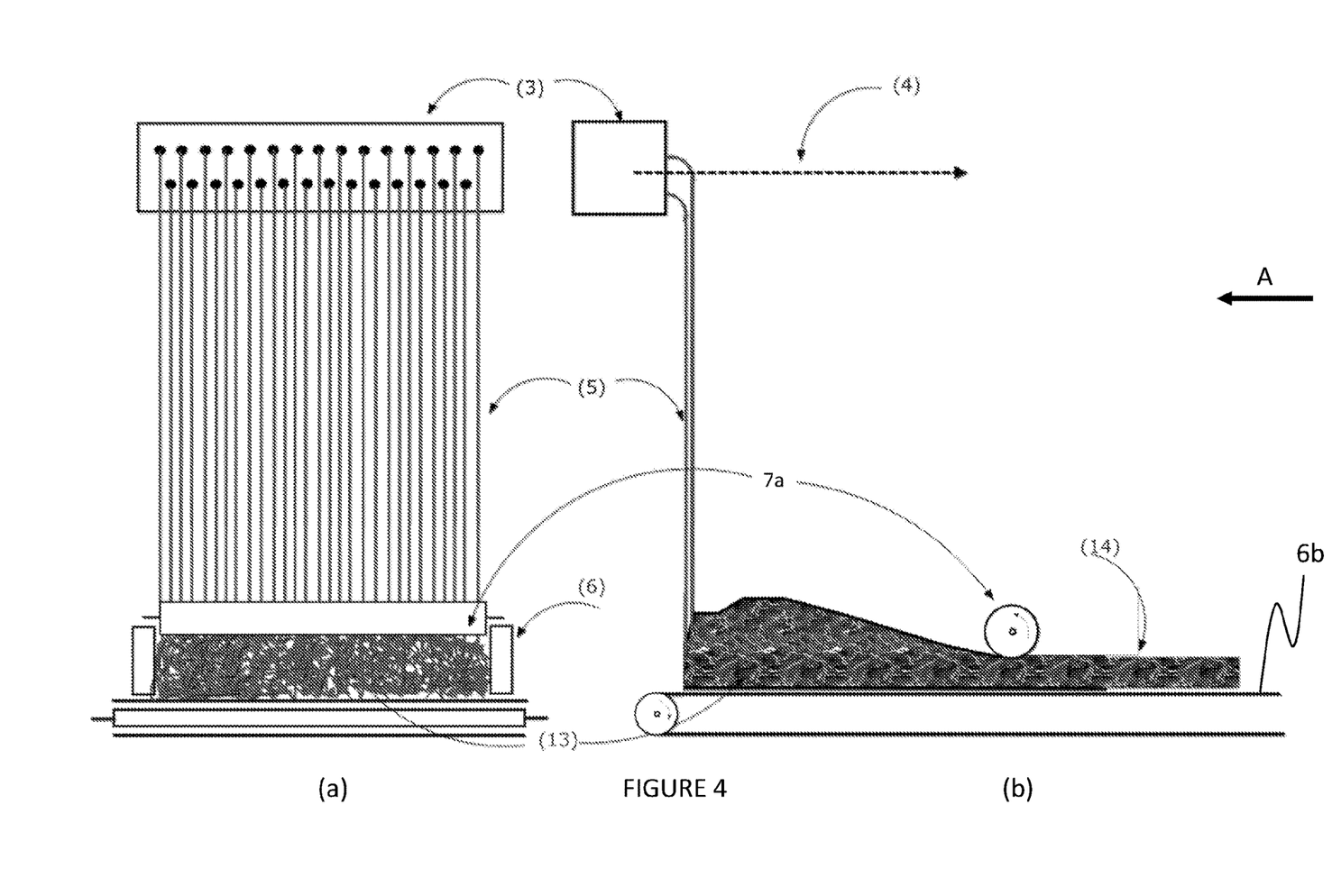
FIGS. 4-6 correspond to FIGS. 1-3 and show a variant embodiment.
Figure 5:
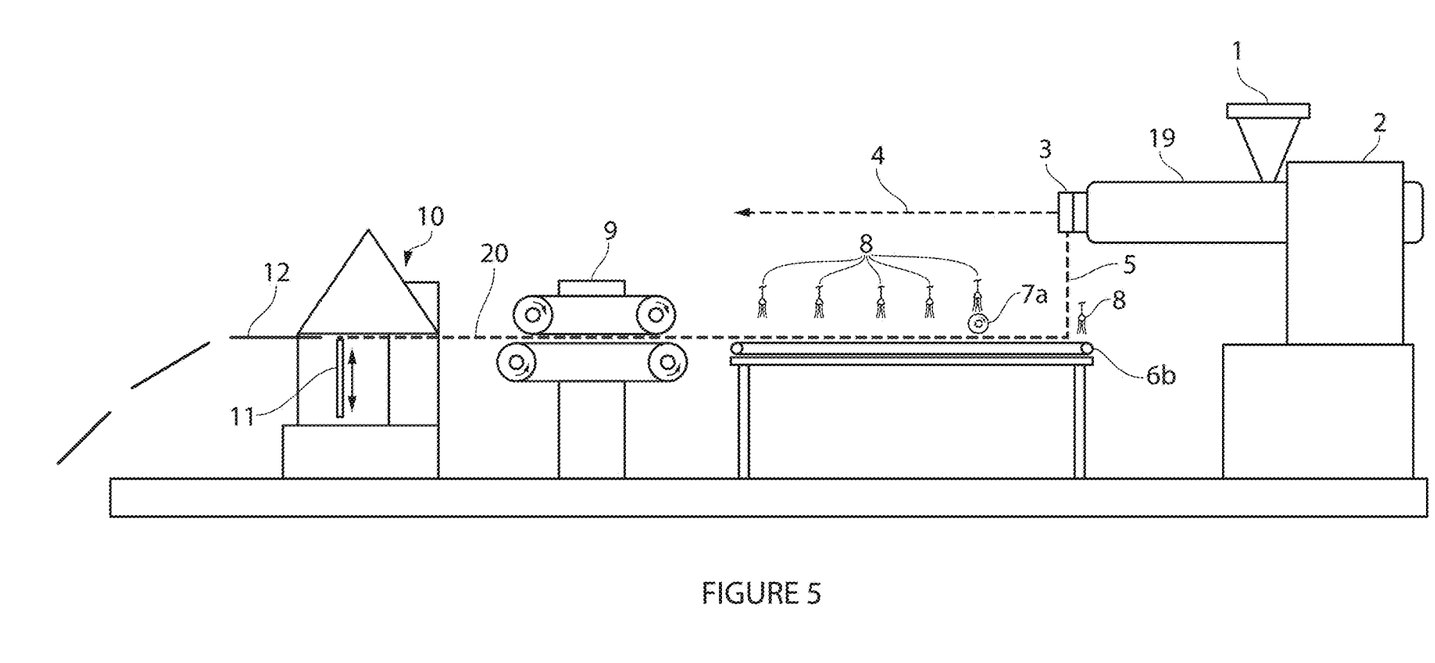

FIGS. 4 and 5 show a former of this kind, where the lower part or base 6 is in the form of a conveyor belt 6*b* with side walls 6 and the upper, shaping, part is in the form of a roller 7*a*; more than one roller 7*a* could be used. FIG. 4(*a*) is a view of the process along the direction of arrow A of FIG.

4(b), the direction of product flow being left to right in FIG. 4(b). The shaping roller 7a is a little way downstream from the beginning of the belt 6b, where the strands 5 land, and the conveyor 6b in effect pushes the agglomeration of strands through the nip formed by the roller 7a and the conveyor 6b to form, in co-operation with the side walls 6, flat panels or batts 20. Cooling sprays 8 can also be employed, as shown in FIG. 1.

It is to be understood that the roller 7a and/or conveyor belt 6b may be textured or smooth. A textured roller 7a and/or conveyor belt 6b has the advantage that a defined surface profile or pattern may be formed in one or both surfaces of the product 20. This may be useful in promoting friction between the product and a surface with which it is in contact in use.

An advantage of embodiments of this kind in which movement of the strand mass 13 is assisted by the conveyor 6b and optionally roller 7a is that there is no risk of the strand mass breaking while being pulled by the haul-off mechanism, as can happen in the embodiment of FIG. 1 if the draw is too strong and the cooling profile too slow.

In some embodiments, the roller 7a is driven and the conveyor 6b is not driven, being caused to move by friction between strand mass 13 and the conveyor 6b as the strand mass 13 is driven by the roller. Alternatively, the conveyor 6b may be driven and the roller 7a not driven. In some embodiments both the roller 7a and conveyor 6b may be driven.

The conveyor belt 6b may be perforated in some embodiments. This has the advantage of reducing a risk of loss of frictional contact between strand mass 13 and belt 6b, and the possibility of 'floating' of the strand mass 13 on the conveyor belt 6b. It may also facilitate recirculation of coolant such as cooling water in some embodiments.

As anyone skilled in the art would appreciate, the addition of colourants, performance enhancers, UV stabilisers, blowing agents and other additives may also be introduced into to the extruder as and when required, as is common practice.

By contrast, an unexpected feature of the invention is that solid contaminants, at least if of a suitable size, are welcomed because they give the strands of plastic a rough surface, which means that they will not pack tightly as they lie across each other, giving the described porous final product.

Such additives or contaminants can be present in the feedstock, as is in any event likely, with particles that are too large for extrusion being filtered out. Non-melting additives that cannot be processed in the extruder may be added to the strand mass 13 whilst it is still hot, or they may be adhered to the profile 12 when it has cooled. Furthermore, impurities that are typically present in recycled plastics can be further advantageous, because they lead to uneven melting/cooling and hence reinforce the tendency of the agglomeration of strands to assemble itself randomly.

A variation provides for the addition of a temperature-controlled extrusion barrel extension, preferably with a minimum wall thickness of 5 mm, to be fitted between the extruder and die plate in order to raise the die plate height relative to the substantially horizontal shaping former. This provides a greater strand fall, perhaps 1 m or more, without raising the whole extruder (which is a large piece of equipment and subject to strict safety requirements). This barrel extension must contain more than one bend, or at least an incline, to provide the height gain. A greater fall causes more randomness in the heap and also allows more cooling during the drop, which can be advantageous.

To increase the randomisation of the substantially continuous falling strands there can be provision to apply a horizontally oscillating action to the substantially horizontal former 6 and 7.

Figure 6:
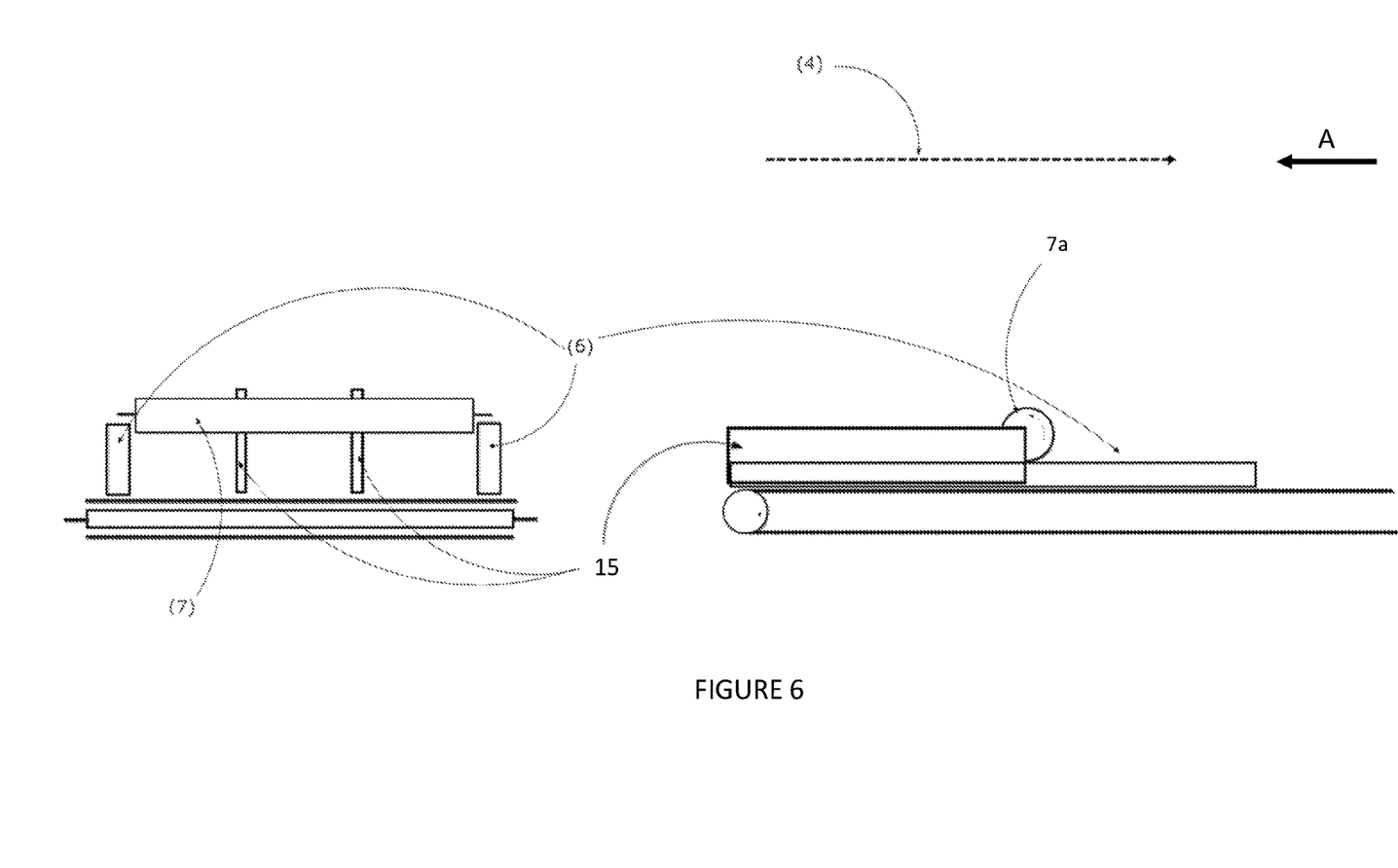

FIG. 6 corresponds to FIG. 3 and shows the embodiment of FIGS. 4 and 5 fitted with the inserts or splitters 15. Again, FIG. 6(a) is a view of the apparatus in the direction of arrow A of FIG. 6(b) which is a side view, the direction of movement of extrudate being from left to right in FIG. 6(b). Inserts 16 may also be employed in the manner described and illustrated above with respect to the embodiment of FIG. 3(a).

Figure 7:
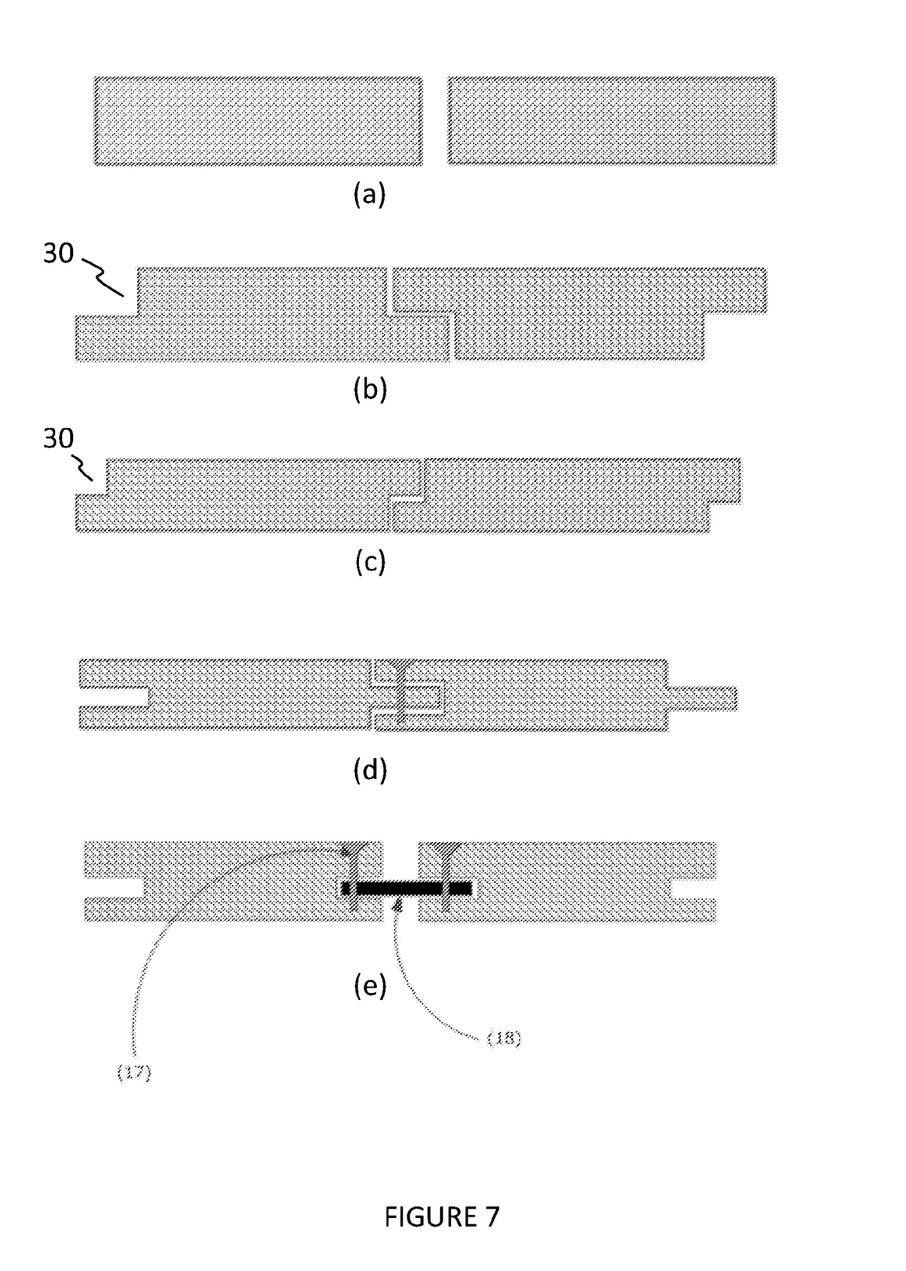
FIG. 7 is a schematic representation showing examples of the cross sections of porous plastic profiles, and the joints between them.

FIG. 7 shows, in cross-section, various profiles such as can be produced by using various inserts in the forming former 6, 7 as described above with reference to FIG. 3 and FIG. 6. The five types shown by way of example are: (a) straight-sided planks, (b) planks with recesses 30 on the same face (for fitting alternate ways up), (c) planks with recesses on opposite faces for fitting adjacently, (d) tongue-and-groove planks like traditional floorboards, possibly for fixing with screws or other fasteners 17, and (e) grooved planks for fixing using separate joining pieces 18, using adhesive and/or screws 17 as before.

Figure 8:
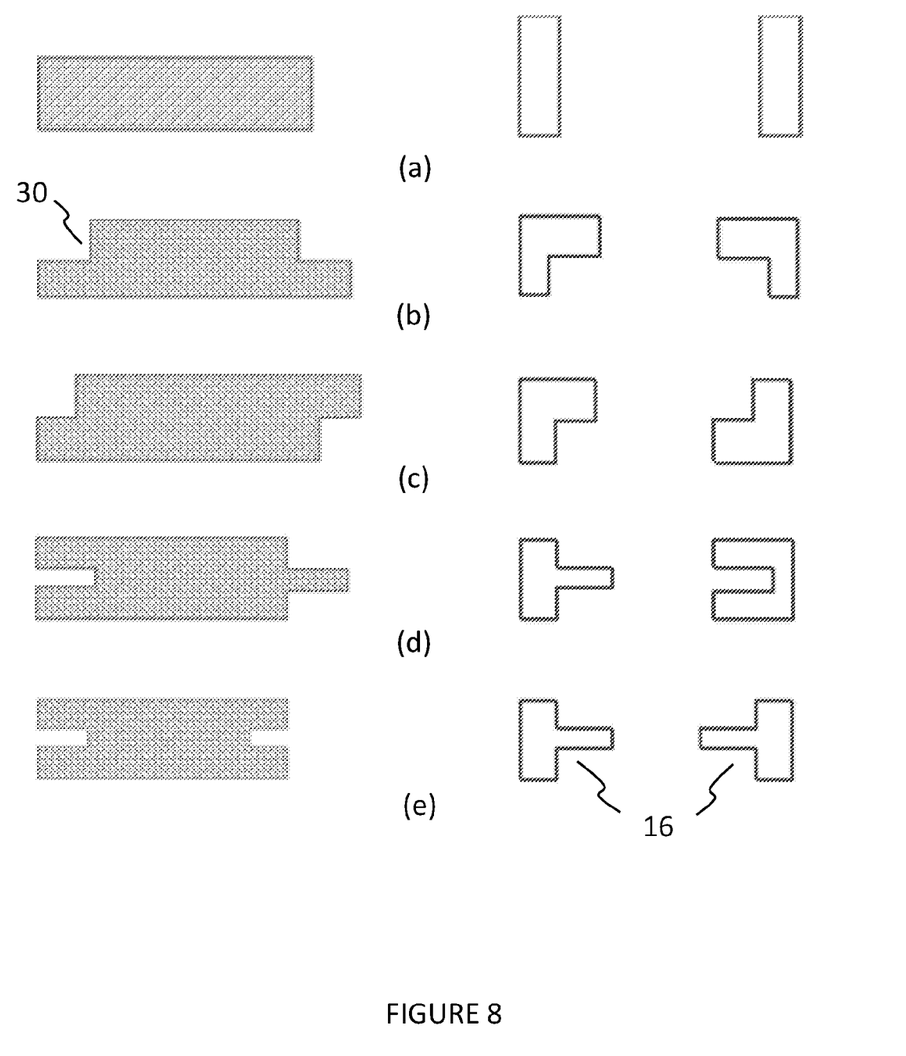
FIG. 8 is diagram corresponding to FIG. 7 and also showing (right hand side) the profiles of the inserts in the forming tool to form the profiles (left hand side)

FIG. 8 shows the inserts 16 used to produce these various profiles. They are generally fixed to the side rails 6 and splitter plates 15 where fitted, as indicated in FIG. 3. Moreover, advantageously the concave and convex shapes contained in all of these side rail formers, which advantageously are chilled, are progressive. They have progressively deepening machining, being smaller in depth at the leading (Extruder) end and get deeper towards the trailing edge (Haul Off end). That is, the shapes are tapered, becoming progressively deeper in the direction of travel of the extrudate 13. It is to be understood that one or more splitter plates 15 (where included) may be similarly constructed in addition or instead of the side rails 6.

In the embodiment of FIG. 8 the splitter plates 15 are cooled in order to reduce sticking of extruded strands to the plates 15. It is to be understood that the coolant used (typically water) to cool the extruded strands is chilled in the present embodiment although unchilled coolant may be used in some arrangements. The coolant is employed at a temperature sufficiently low to provide adequate cooling of the strands.

In some embodiments one or more holes (aperture) in the die head 3 may be blocked in order to reduce the risk of sticking of extruded strands to the splitter plate(s) 15 and/or side rails 6.

This progressive shaping allows the molten plastic to be pressed into shape gradually (the distance between the side rails at the leading end is wider than the trailing end) compressing the extrudate horizontally and filling the side rail formers, thus allowing the shaped profile to be formed until cooling is complete at the nip roller 9.

Figure 9:
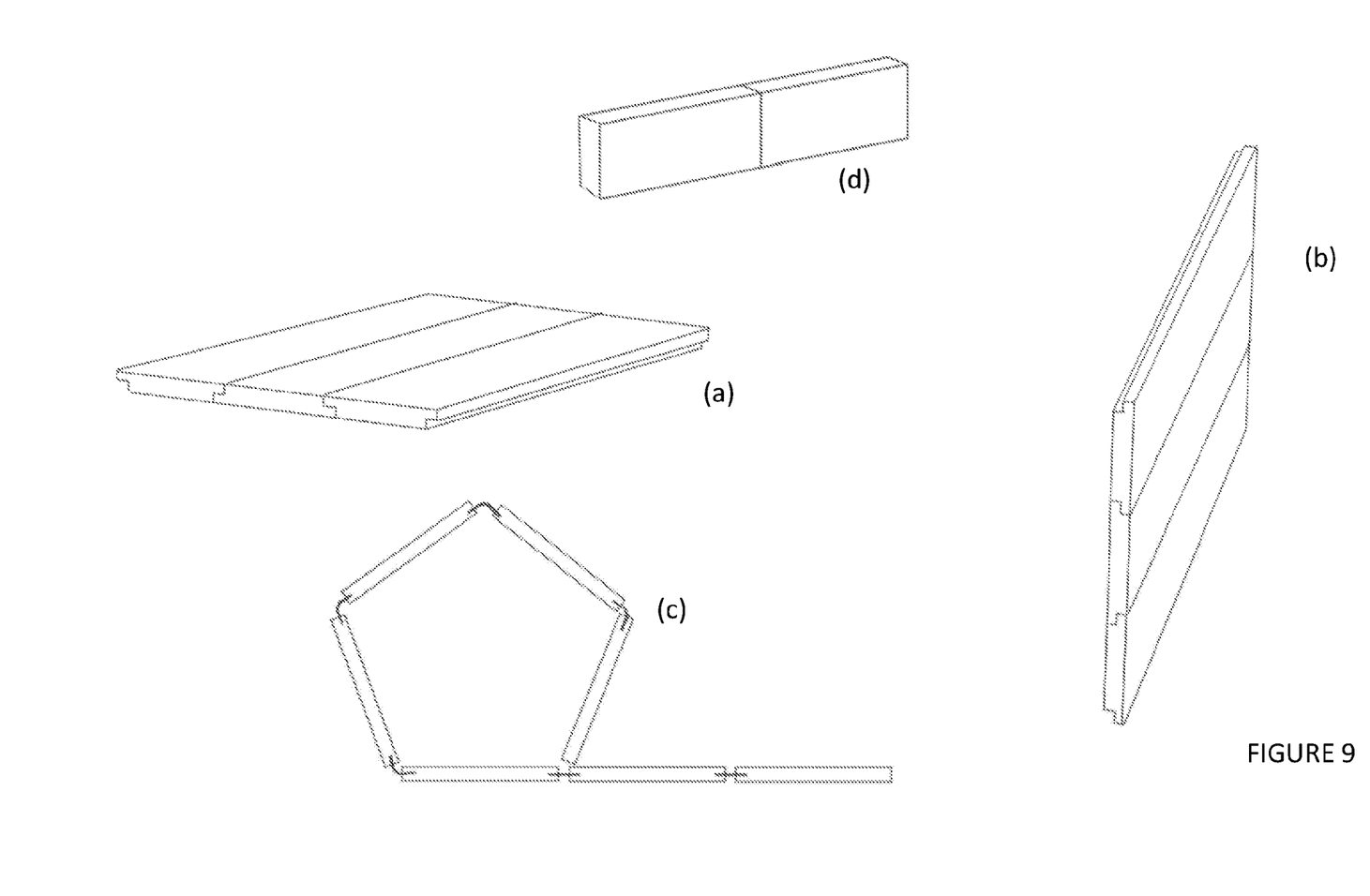
FIG. 9 is a schematic representation showing (a) porous plastic profiles joined laterally to one another in the horizontal plane; (b) porous plastic profiles joined laterally to one another in the vertical plane; (c) cross section of partially rolled porous plastic profiles complete with hinges; and (d) porous plastic profiles abutted longitudinally end to end, forming a ribbon-like drainage element.

The drawing in FIG. 8(a) to (e) features the cross section of the rails at the trailing end of course. In order from top to bottom they relate to the FIG. 4 profile Cross Sections, namely:

(a) Slab-Sided
(b) Regular Step
(c) Irregular Step
(d) Tongue & Groove
(e) Groove & Groove The finished Profiles are shown again in cross section on the left and their corresponding pair of chilled side rail formers on the right configured to shape both left and right sides of the extrudate simultaneously. The continuous profiles of this kind enable a wide variety of applications and examples are shown schematically in FIG. 9. For instance, the porous plastic profiles can be used horizontally abutted to one another along their sides as in FIG. 9(a), forming a mat for use on roofs, floors or sub-floors; or, when arranged vertically, singly or placed one on top of another to form walls as in FIG. 9(b). Whether used horizontally or vertically, the jointing of the boards together with fixings such as screws 17 or without separate fixings is a key feature of this product and is enabled by the high tensile strength in the plane of the profile. When forming a floor or substrate from a number of individual pieces it is beneficial for them both to be uniform in thickness and to be firmly attached to each other, as this reduces the risk of tripping. This embodiment therefore is preferable to existing alternatives and offers distinct advantages in the market.

In another variant the jointing elements 18 of FIG. 7 (e), inserted into recesses in the boards in the machine direction post production, may be flexible, achieving a hinge effect. This allows for the joining of numerous profiles together. The hinge effect allows the resulting chain of profiles to be rolled up for ease of deployment as in FIG. 9(c). This addition offers numerous advantages in the market, providing for example for the production of temporary or semi-permanent roll-out surfaces or other structures.

When used underground abutted longitudinally end to end forming a ribbon-like drainage element, as in FIG. 9(d), jointing is not required and as such the production of merely abutting (non-joinable) profiles is within the scope of the invention.

Aspects of the invention are listed in the following numbered paragraphs:

1. A method of forming porous thermoplastic profiles with more than one substantially parallel plane, which can be connectable, formed from substantially endless uniform strands of extruded recycled thermoplastic which are randomised, contact welded together and shaped by compression.

2. The method of paragraph 1 and further comprising the cooling of the porous plastic profile.

3. The method of any of the preceding paragraphs, and further comprising the pulling of the porous plastic profile by a variable speed device(s).

4. The method of any of the preceding paragraphs further comprising the cross cutting of the resultant continuous profile into required lengths once sufficiently cooled.

5. The method of any of the preceding paragraphs further comprising a method of applying adjustable compressive force to the random strand mass pre-completion of cooling.

6. The method of any of the preceding paragraphs further comprising the addition of substantially vertically orientated plate(s) causing numerous profiles to be produced simultaneously.

7. The method of any of the preceding paragraphs further comprising the addition of substantially horizontally mounted inserts within the strand mass creating longitudinal recesses allowing the connection together of numerous profiles.

8. The method of any of the preceding paragraphs further comprising the addition of perforations to the substantially horizontally mounted tool in order for the cooling agent to penetrate through the tool walls.

9. The method of any of the preceding paragraphs further comprising the addition of an internal cooling method within the walls of the substantially horizontally mounted tool.

10. The method of any of the preceding paragraphs further comprising the addition of additives to the molten strand mass after extrusion and before or during compression.

11. The method of any of the preceding paragraphs further comprising the addition of performance enhancing or colour inducing additives before or during extrusion.

12. The method of any of the preceding paragraphs further comprising the alteration or adjustment of the extrusion line geometry in such a way as to allow the introduction of woven or non-woven linear items into the molten strand mass after extrusion and before or during compression thus altering the performance characteristics of the profiles.

13. The method of any of the preceding paragraphs further comprising the addition of a temperature-controlled extrusion barrel extension containing more than one bend with a minimum wall thickness of 5 mm fitted between the extruder and die plate in order to alter the height of the die plate relative to the landing level of the molten uniform strand.

14. The method of any of the preceding paragraphs further comprising the addition of pre-cooling to the molten uniform spaghetti like strands prior to accumulation and randomisation.

15. The method of any of the preceding paragraphs further comprising the reduction in temperature of the die plate causing the surface of the molten uniform spaghetti like strand to develop a roughened surface caused by the increase in friction between the molten plastic and the die plate as it exits the die plate holes.

16. The method of any of the preceding paragraphs further comprising the repeat indentation into the surface of the profiles using roller(s) with machined surfaces horizontally oriented substantially at 90 degrees to the machine direction.

17. The method of any of the preceding paragraphs further comprising the addition post production of any mechanism or fixing of numerous profiles to be indirectly joined together allowing a plurality of profiles to be connected which can be formed into a substantially continuous temporary roll.

The method of any of the preceding paragraphs further comprising the addition post production of any mechanism or fixing allowing a plurality of profiles to be directly joined together creating a substantially even surface with reduced inter profile movement and flexibility.

The invention claimed is:

1. A method of forming porous thermoplastic profiles, comprising:
    extruding molten strands of thermoplastic material of a diameter between about 3-12 mm to a length of at least 1 m;
    letting the molten extruded strands of thermoplastic material drop at least 15 cm onto a horizontal forming base where the molten extruded strands of thermoplastic material contact each other and agglomerate to form a porous molten strand mass;
    shaping the molten strand mass to form a profile;
    transporting the profile along the base;
    cooling the profile by means of a water spray or bath; and
    separating the cooled profile into lengths.

2. A method according to claim 1, wherein separating the cooled profile into lengths comprises cross cutting the cooled profile into the lengths once sufficiently cooled.

3. A method according to claim 1, further comprising dividing the porous molten strand mass by one or more vertically orientated plates causing more than one profile to be produced simultaneously.

4. A method according to claim 1, further comprising shaping the profile by horizontally mounted inserts within the porous molten strand mass creating longitudinal recesses allowing lateral connection together of numerous profiles.

5. A method according to claim 1, further comprising adding non-melting particles to the thermoplastic material before the extruding.

6. A method according to claim 1, wherein the strands of thermoplastic material include recycled thermoplastic material.

\* \* \* \* \*